(12) United States Patent     (10) Patent No.:   US 12,697,758 B2

Svoboda            (45) Date of Patent:      Aug. 4, 2026

---

(54) COLUMN-FREE CLOSING UNIT FOR AN INJECTION-MOULDING APPARATUS

(71) Applicant: WOOJIN PLAIMM GMBH, Leobersdorf (AT)

(72) Inventor: Georg Svoboda, Incheon (KR)

( * ) Notice: Subject to any disclaimer, the term of this patent is extended or adjusted under 35 U.S.C. 154(b) by 26 days.

(21) Appl. No.: 18/555,589

(22) PCT Filed: Jun. 29, 2022

(86) PCT No.: PCT/AT2022/060226

§ 371 (c)(1),
(2) Date: Oct. 16, 2023

(87) PCT Pub. No.: WO2023/272324

PCT Pub. Date: Jan. 5, 2023

(65) Prior Publication Data

US 2024/0198567 A1     Jun. 20, 2024

(30) Foreign Application Priority Data

Jul. 1, 2021    (AT) .............................. A 50546/2021

(51) Int. Cl.
*B29C 45/17*       (2006.01)
*B29C 33/24*       (2006.01)

(52) U.S. Cl.
CPC .......... *B29C 45/1775* (2013.01); *B29C 33/24* (2013.01); *B29C 45/1744* (2013.01); *B29C 45/1761* (2013.01)

(58) Field of Classification Search
CPC .. B29C 45/1775; B29C 45/1744; B29C 33/24
See application file for complete search history.

(56) References Cited

U.S. PATENT DOCUMENTS

| | | | | | |
|---|---|---|---|---|---|
| 5,707,665 | A | * | 1/1998 | Urbanek | ................. B29C 45/17 |
| | | | | | 425/589 |
| 6,575,732 | B2 | * | 6/2003 | Kappelmuller | ..... B29C 45/1761 |
| | | | | | 100/231 |

(Continued)

FOREIGN PATENT DOCUMENTS

| | | | | | |
|---|---|---|---|---|---|
| CN | 111571711 | A | * | 8/2020 | ................. B26F 1/16 |
| DE | 19633688 | A1 | * | 1/1997 | ......... B29C 45/1761 |

(Continued)

OTHER PUBLICATIONS

Machine translation JPH0857924A (Year: 1996).*

(Continued)

*Primary Examiner* — Abbas Rashid
*Assistant Examiner* — Wayne K. Swier
(74) *Attorney, Agent, or Firm* — Patshegen IP; Moshe Pinchas

(57) ABSTRACT

The present invention relates to a column-free closing unit for an injection-moulding apparatus, wherein a fixed platen (5) is provided, and this platen is arranged on a first wing (3), wherein the fixed platen (5) is fixed to the first wing (3) at a fastening region (9), wherein a closing device (6) is provided, and this closing device acts on a second wing (4) and is connected to a movable platen (7), wherein the closing device (6) is designed to exert a pressing force in the direction of the fixed platen (5), wherein the fixed platen (5) is supported beneath the fastening region (9) via a supporting device, wherein the supporting device comprises a connecting bar (10), which run substantially orthogonally in relation to the longitudinal axis (8) of the machine, wherein the supporting device comprises at least one spring bar (11), wherein the spring bar (11) is designed to transmit the pressing force from the fixed platen (5) to the connecting bar (10), wherein the spring bar (11) runs substantially orthogo- (Continued)

nally in relation to the longitudinal axis (8) of the machine and in relation to the connecting bar (10).

17 Claims, 3 Drawing Sheets

(56)                    References Cited

U.S. PATENT DOCUMENTS 6,769,897  B2 *   8/2004  Eppich ................. B30B 15/047
                                                                425/149
9,205,584  B2 *  12/2015  Wimbauer .......... B29C 45/1761

FOREIGN PATENT DOCUMENTS

EP             0999926  B1 *  10/2001   ......... B29C 45/1761
FR             2834237  A1 *   7/2003   ......... B29C 45/1761
JP             H0857924  A  *   3/1996   ......... B29C 45/1761

OTHER PUBLICATIONS

Machine translation DE19633688A1 (Year: 1997).*
Machine translation EP0999926B1 (Year: 2001).*
Machine translation FR2834237A1 (Year: 2003).*
Machine Translation CN111571711A (Year: 2020).*

* cited by examiner

COLUMN-FREE CLOSING UNIT FOR AN INJECTION-MOULDING APPARATUS

The present invention relates to a closing unit, in particular a column-free closing unit, for an injection-moulding unit and the arrangement of a closing unit according to the invention with an injection-moulding apparatus.

Closing units or closing devices are known to be used in injection moulding for holding the injection-moulding tool. Important functions performed by a closing unit thus include closing the mould halves and adjusting the clamping force before injection of the casting material, keeping the mould halves closed during injection and opening the mould halves after injection is complete.

For this purpose, at least two opposing mould clamping plates and a closing or locking mechanism are usually provided on known closing units, whereby these components are held on a frame. The mould clamping plates are set up to support the mould halves.

With regard to the construction of the frame, two fundamentally different types of closing units are known in prior art. On the one hand, closing units can be formed with columns, in which the mould clamping plates are held by a column construction. On the other hand, closing units may be designed without columns. Such a structure is also described as a tie-bar-less closing unit, wherein the mould clamping plates in the latter type are held on a mostly C- or H-shaped frame, which is open on one side, e.g., upward.

An essential advantage of such column-less closing units is that they allow easy access to the working area of the tool. One aspect to be considered in the design, however, is that due to the frame construction used, special measures must be taken to maintain the plane parallelism of the mould clamping plates during the injection-moulding process. Maintaining plane parallelism is important, among other things, in order to produce high-quality moulded parts.

In the case of the first column-free closing units available on the market, an attempt was made to keep the machine frame as stiff as possible in order to prevent the frame from bending open and thus to maintain the plane parallelism of the mould clamping plates.

However, this led to closing units with comparatively high weight and large material requirements during production.

It was later recognized that a certain deformation is permissible, but that it can or must be compensated in order to obtain the desired results.

In the prior art, different solutions are proposed for this, for example the articulated mounting of a mould clamping plate or the use of flexible holders for a mould clamping plate, as well as the active compensation of the pressing pressure by compensation devices.

A generic closing unit, in which the fixed mould clamping plate is supported against the machine frame via a support device, is known from AT 514 382 B1. The support device described there is designed in such a way that it comprises at least one compression bar running in the longitudinal direction of the machine and at least one bending beam running transversely to the longitudinal direction of the machine, the latter being connected to the machine frame. The pressing or locking force is partially transmitted to the compression bar and the bending beam, which leads to compression of the compression bar and/or bending of the bending beam. With a corresponding design of the two aforementioned elements, the plane parallelism of the mould clamping plates can be maintained as far as possible during the injection process, i.e. in particular during the tumbler.

A disadvantage of the solution proposed in AT 514 382 B1, however, is that a completely satisfactory adjustment of the deflection cannot be achieved with a single compression rod and a single bending beam. For improvement, a plurality of serially arranged parts of the support element may be provided, which is also proposed in AT 514 382 B1. But this measure in turn means a large design and cost outlay as well as a high space requirement. In addition, due to the course of the pressure rod in the direction of the longitudinal axis of the machine, only a limited free space is available at the rear end of the stationary mould clamping plate. However, it would be desirable to have more space at this point for the manipulation of the injector.

The object of the present invention can thus be seen as overcoming the disadvantages of AT 514 382 B1 and creating a closing unit for an injection-moulding apparatus that allows better coordination of the deflection of the support device while simultaneously reducing the material and construction effort and the total weight of the closing unit.

The present invention thus preferably relates to a column-less or tie-bar-less closing unit for an injection-moulding apparatus, wherein the closing unit comprises a machine frame comprising a first wing and a second wing. Preferably, a stationary mould clamping plate is arranged on the first wing, the stationary mould clamping plate being fixedly connected to the first wing at a fastening region. In this context, the term "fixed" means, in particular, that there is no movable mounting, for example via joints or the like. An example of a fixed connection is a screw connection.

The stationary mould clamping plate is, in particular, that mould clamping plate through which the nozzle of an injection-moulding apparatus is guided and can therefore also be referred to as a nozzle plate. It is preferably provided that a closing device, which is connected to a movable mould clamping plate, acts on the second wing, wherein the closing device is configured to move the movable mould clamping plate in a longitudinal axis of the machine and to exert a pressing or locking force in the direction of the stationary mould clamping plate. During tightening, deformation of the machine frame occurs, whereby in particular the free ends of the two wings spread apart and/or bend apart.

Preferably, the stationary mould clamping plate is elastically supported against the machine frame below the fastening region via a support device, wherein the support device comprises a connecting beam extending substantially orthogonally to the longitudinal axis of the machine.

The object of the invention is achieved by a closing unit having the features of the independent patent claim.

Provision is preferably made for the supporting device to comprise at least one cantilever spring that is subjected to bending stress when the pressing force is applied.

Preferably, the spring beam is designed to transmit the pressing force from the fixed mould clamping plates to the connecting beam.

It is preferably provided that the cantilever extends substantially orthogonal to the longitudinal axis of the machine and substantially orthogonal to the connecting cantilever.

As a result of this arrangement, the pressing force can be introduced into the cantilever beam substantially orthogonally, thus transversely, to its direction of longitudinal extension. As a result, the spring beam differs significantly from the compression rod of AT 514 382 B1, in which the pressing force is introduced in the longitudinal direction. Such a pressure rod is not provided in the present invention, since the support device preferably does not have an element into which force is introduced in the longitudinal axis of the machine.

Surprisingly, this preferred arrangement described above makes it possible for the entire deflection to be compensated for by the cantilever. The design of the cantilever can easily be adapted to the locking force, the exact frame geometry, etc. In addition, a single spring bar can be used for sufficient adjustability of the deflection, and a serial connection of a plurality of elements that absorb the locking force is not required, in contrast to AT 514 382 B1.

In particular, the spring profile of the cantilever is linear in the working range of the closing unit, i.e., for example, between 100 and 10,000 kN, optionally between 200 and 6,000 kN. In other words, the spring hardness of the canti-lever in particular is constant in the working range of the closing unit. This enables a particularly simple design of the cantilever without empirical tests.

Preferably, the connecting beam serves only to support the cantilever against the machine frame and essentially does not contribute to compensating for the deflection. In this context, it should be noted that the connecting beam usually bends to a small extent when the locking force is applied, but this deformation does not play a significant role in compen-sating for the widening of the frame. For example, the connecting beam can bend by at most 100 pm, preferably by at most 75 pm.

If necessary, the machine frame comprises at least two frame parts. The frame parts may be separate components held together by connecting means to form the machine frame. The frame parts can also form a common, in particu-lar integrally formed, component. If necessary, in the pres-ence of two frame parts, the fastening region comprises at least two fastening surfaces spaced apart from one another and arranged on different frame parts.

In a further preferred embodiment, it is provided that the construction according to the invention comprises two spring beams arranged next to one another. "Side by side" in this context means, in particular, that both spring beams are arranged along the longitudinal extension direction of a connecting beam. In other words, "side by side" can mean that the locking force is introduced into the spring beams in parallel, i.e. not in series.

The design with two spring beams arranged next to each other allows further improvements compared to the prior art, wherein in particular the plate parallelism of the mould clamping plates can be adjusted even better and the support device has a better tolerance against asymmetric force introduction, which can occur, for example, due to off-centre internal mould pressure.

If the features of a cantilever are described in the present description, this designates, unless explicitly stated, the features of one, a plurality of or all cantilevers of the closing unit according to the invention. The wording used in the singular is used for easier readability.

The cantilever may be configured as a separate compo-nent that is arranged between the fixed mould clamping plates and the connecting beam in such a way that the transmission of the locking force to the machine frame is made possible. However, the spring beam can also be formed integrally with the stationary mould clamping plates, for example as an extension provided on the stationary mould clamping plates.

In one embodiment, a connecting beam may be provided on which one or more spring beams are supported, with one connecting beam connecting two frame parts or frame sides. In this case, the connecting beam may be inserted into recesses or openings for support on the frame, but other types of connection to the frame may also be selected, for example, the support of the connecting beam on lugs or extensions of the frame parts or a direct screwing of the connecting beam to the frame.

In an alternative embodiment, a separate connecting beam may be disposed on each of the at least two frame parts. In this case, the connecting beams do not connect the two frame parts. The connecting beams may, for example, be in the form of lugs or extensions integrally formed with the frame members, allowing alternative fastenings. In this embodiment, it is preferred that one spring beam is provided per connecting beam and is arranged on this connecting beam.

If appropriate, it is provided that the fastening region at which the fixed mould clamping plate is fixedly connected to the machine frame is arranged above the support region at which the spring beam is connected to the fixed mould clamping plates. If necessary, the fastening area is located in the upper half of the fixed mould clamping plates. The fastening area can also be located in the middle of the fixed mould plates. If necessary, the support region is located in the lower half, preferably in the lower third, of the fixed mould clamping plate.

Optionally, it is provided that the connecting beam lies below the support region, and/or that the spring beam runs downwards starting from the support region. In particular, starting from the support area, the cantilever can point away from the free end of the first wing. This design enables particularly good accessibility of the nozzle opening pro-vided in the fixed mould clamping plate. This also applies if the cantilever is formed integrally with the fixed mould clamping plates and the cantilever faces away from the free end of the first wing.

If a plurality of spring beams are provided, which are arranged next to one another along the longitudinal exten-sion direction of a connecting beam, it is provided in particular that the spring beams run substantially parallel to one another.

In order to be able to compensate for any manufacturing and/or assembly tolerances and to be able to individually adjust the parallelism of the two mould plates before the clamping force is applied, the closing unit may comprise an adjusting device. In general, this adjustment device may allow the inclination of the fixed mould plates to be adjusted. This can be achieved by different
    means, for example by an adjusting means, such as an
        adjusting screw, and/or an angled contact surface.

The machine frame can be C-shaped or H-shaped in a known manner. If the machine frame is H-shaped, it addi-tionally has third and fourth wings opposite the first and second wings. In order to achieve an improved compensa-tion of the frame deformation, a compensation device can be arranged between the third and fourth wings, which applies a compensation pressure to the third and fourth wings that is dependent on the locking force.

The compensation device may be a compensation cylin-der, for example. The compensation device can be opera-tively connected to the closing device, for example via a hydraulic connection.

The locking device can enable a positive locking and/or a non-positive locking. Examples of locking devices with positive locking are the mechanical tumbler or the hydraulic tumbler. Examples of a non-positive locking are the mechanical-hydraulic tumbler or the electromechanical tum-bler. A special example of mechanical tumbler is the toggle lever system.

The present invention preferably relates to a column-free closing unit for an injection-moulding apparatus, wherein the closing unit has a machine frame, optionally comprising two frame parts, wherein the machine frame comprises a first wing and a second wing, wherein a fixed mould plates is provided which is arranged on the first wing, wherein the fixed mould plates is fixedly connected to the first wing at a fastening region, wherein a closing device is provided which engages on the second wing and which is connected to a movable mould plates, wherein the closing device is adapted to move the movable mould plates along a machine longitudinal axis and to exert a pressing force in the direction of the fixed mould plates, wherein the fixed Mould clamping plate below the fastening region is elastically supported against the machine frame via a support device, wherein the support device comprises a connecting beam running substantially orthogonal to the longitudinal axis of the machine.

Provision is preferably made for the supporting device to comprise at least one cantilever spring which is subjected to bending stress when the pressing force is applied, the cantilever spring being designed to transmit the pressing force from the fixed mould clamping plates to the connecting beam, and for the cantilever spring to run essentially orthogonal to the longitudinal axis of the machine and essentially orthogonal to the connecting beam.

Provision is optionally made for a connecting beam to connect the two frame parts to one another, or for two separate connecting beams to be provided, each of which is arranged on a frame part.

Optionally, it is provided that the support device comprises a plurality of, in particular two, spring beams, wherein the spring beams are arranged next to one another in the longitudinal extension direction of a connecting beam.

If appropriate, it is provided that a spring beam is arranged on each connecting beam if two separate connecting beams are provided.

It is optionally provided that the spring beam(s) is/are connected to the fixed mould clamping plate at a support region, wherein the support region is arranged in the lower half, preferably in the lower third, of the fixed mould clamping plate, and wherein the fastening region is preferably arranged in the upper half of the fixed mould clamping plate. It is optionally provided that the spring beam(s) is/are formed integrally with the fixed mould clamping plate.

Optionally, it is provided that the support region is arranged above the corresponding connecting beam with respect to the longitudinal axis of the machine.

Optionally, it is provided that the cantilevers extend substantially parallel to one another when a plurality of cantilevers are provided.

If necessary, it is provided that an adjusting device is provided, which is configured to adjust the inclination of the fixed mould clamping plate.

Optionally, it is contemplated that the adjustment device comprises an angled abutment surface, the angled abutment surface being disposed on one or more of the following components:

on the fixed mould clamping plates in the connection area to the cantilever, wherein the angled contact surface is arranged in particular on the support area, on the spring beam in the connection area to the fixed mould clamping plate, on the cantilever in the connecting area to the connecting cantilever, on the connecting beam in the connecting area to the cantilever,

wherein the angled contact surface has an angle of inclination a of greater than 0° with respect to the longitudinal extension direction of the cantilever, wherein optionally at least one angled contact surface is provided per cantilever.

Optionally, it is provided that the adjusting device comprises a wedge element.

Optionally, it is provided that the adjusting device comprises an adjusting screw, wherein an adjusting screw is optionally provided on each spring beam.

Optionally, it is provided that the cantilever(s) is/are screwed to the fixed mould clamping plates, and/or that the cantilever(s) is/are screwed to the connecting cantilever.

Optionally, it is provided that the cantilever(s) is/are biased against the fixed plates.

Optionally, it is provided that the connecting beam(s) is/are inserted into recesses of the frame parts, or that the connecting beam(s) is/are made in one piece with at least one frame part.

Optionally, it is provided that the machine frame has a substantially C-shaped frame geometry.

Optionally, it is provided that the machine frame has a substantially wing-shaped frame geometry, wherein the machine frame additionally comprises a third wing and a fourth wing, wherein a compensation device is arranged between the third wing and the fourth wing.

If necessary, it is provided that the compensation device is operatively connected to the closing device.

Optionally, it is provided that the closing device comprises an electric, hydraulic and/or mechanical closing mechanism.

Preferably, the invention further relates to an arrangement of an injection-moulding apparatus with a closing unit as described above, wherein an injection nozzle of the injection-moulding apparatus is arranged on the stationary mould clamping plate.

For the purposes of the present invention, the direction of longitudinal extent of a component or element is intended to denote, in particular, the greatest spatial extent of this component or element. In a general example, the longitudinal extension direction of a cuboidal beam with the dimensions X=50 cm, Y=10 cm, Z=10 cm is thus the X direction.

In the context of the present invention, when relative terms such as "top", "bottom", "above" or "below" are used, this refers in particular to the position in the intended orientation of the closing unit or the orientation in its operating position. For example, in the operating position, the first and second wings face upward.

Further features of the present invention emerge from the patent claims, the figures and the description of the exemplary embodiments.

The invention is explained in detail below with reference to exemplary, non-limiting exemplary embodiments.

Figures 1, 2, 3:
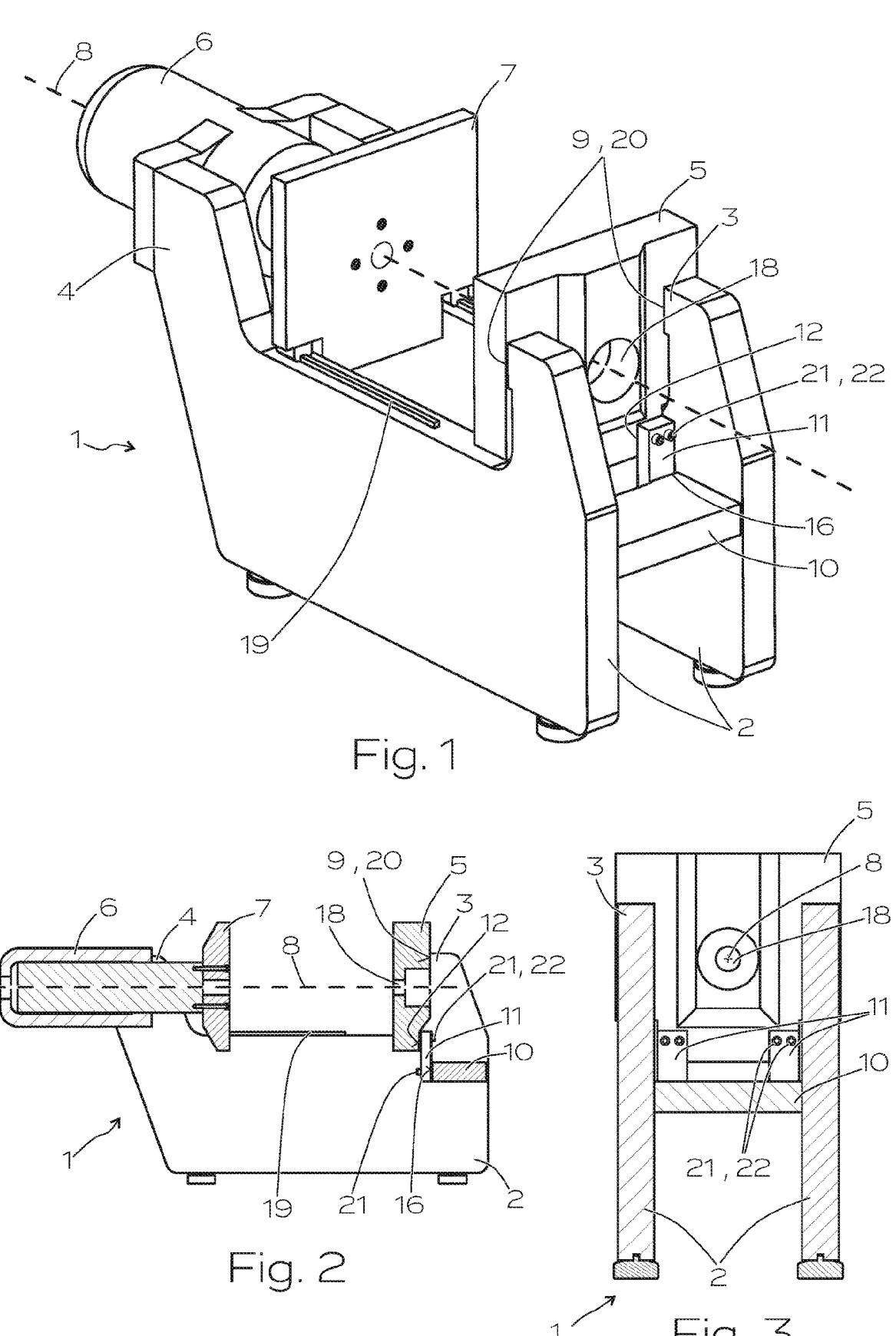
FIG. 1 shows a schematic perspective view of a closing unit according to a first exemplary embodiment according to the invention.
FIG. 2 is a schematic sectional view of the closing unit of FIG. 1.
FIG. 3 is another schematic sectional view of the closing unit of FIG. 1.

Unless otherwise indicated, the following elements are shown in the figures: Machine frame 1, Frame part 2, First wing 3, second wing 4, fixed Mould clamping plate 5, Closing device 6, movable Mould clamping plate 7, Machine longitudinal axis 8, Fastening area 9, Connecting beam 10, Spring beam 11, First supporting area 12, Angled contact surface 13, Third wing 14, Third wing 15, Second supporting area 16, Compensation device 17, nozzle opening 18, Guide device 19, Fastening surface 20, Screw connection 21, Adjusting screw 22.

FIG. 1 shows a schematic perspective view of a closing unit according to a first exemplary embodiment according to the invention. The closing unit in FIG. 1 comprises a Machine frame 1, which comprises two Frame parts 2. In this exemplary embodiment, the Machine frame 1 is C-shaped and comprises a First wing 3 and a Second wing 4.

Arranged on the First wing 3 is a fixed Mould clamping plate 5, which comprises a Nozzle opening 18 for the passage of the nozzle of an injection-moulding apparatus. The stationary Mould clamping plate 5 can therefore also be referred to as a nozzle plate.

A Closing device 6, which carries a movable Mould clamping plate 7, is arranged on the Second wing 4. The Closing device 6 is configured to apply a pressing force in the direction of the longitudinal axis 8 of the machine. In this exemplary embodiment, the Closing device 6 is a hydraulic Closing device 6. In a known manner, the movable Mould clamping plate 7 is guided in the region of its underside via a Guide device 19 on the Machine frame 1.

The stationary Mould clamping plate 5 is fixedly connected to the machine frame at a fastening region 9, which is designed in the form of two opposite fastening surfaces 20, each lying on a frame part 2. In this exemplary embodiment, the connection to the fastening region 9 is realized by screw connections (not shown). The mounting area 9 is located in the upper half of the fixed Mould clamping plates 5.

In the lower part of the stationary Mould clamping plates 5, the latter is supported against the Machine frame 1 via a supporting device, the supporting device comprising a Connecting beam 10 and two Spring beams 11 arranged next to one another.

The Connecting beam 10 connects the two Frame parts 2 to one another and is screwed to the Machine frame 1 (not shown). The Connecting beam 10 extends substantially orthogonally to the Machine longitudinal axis 8. In order to transmit the pressing force from the lower part of the stationary Mould clamping plate 5 to the Connecting beam 10 and thus further to the Machine frame 1, two spring beams 11 are provided between the stationary Mould clamping plate 5 and the Connecting beam 10, which are connected on the one hand via a support region 12 to the stationary Mould clamping plate 5 and on the other hand via a second support region 16 to the Connecting beam 10. The two spring beams 11 run essentially orthogonal to the Machine longitudinal axis 8 as well as essentially orthogonal to the Connecting beam 10.

The spring beams 11 are connected to the respective further components at the first support region 12 and at the second support region 16 via screw connections 21. The Spring beams 11 are designed in such a way that their spring hardness is constant in the range between 500 and 5,000 kN.

FIG. 2 shows a schematic sectional view of the closing unit of FIG. 1 along a plane parallel to the Longitudinal axis 8 of the machine. FIG. 2 illustrates the course of the cantilevers 11 starting from the First support area 12 downwards, i.e. pointing away from the end of the First wing 3.

FIG. 3 shows a schematic sectional view of the closing unit of FIG. 1 along a plane transverse to the Longitudinal axis 8 of the machine. Both Spring beams 11 can be seen here, which run essentially parallel to one another and are arranged next to one another on the Connecting beam 10.

The mode of operation of the closing unit according to the first exemplary embodiment described above is as follows: To produce a cast part, corresponding mould halves (not shown) are arranged on the mould clamping plates 5, 7. With the aid of the Closing device 6, the mould or tool halves are pressed against one another and the moulding material is injected into the tool via an injection-moulding apparatus (not shown) arranged in the region of the fixed Mould clamping plate 5. The injection of the casting material produces a buoyancy force that counteracts the locking force of the closing unit. These opposing forces would cause the wings 3, 4 to spread apart, which in turn means that the Mould clamping plates 5, 7 are no longer arranged parallel to one another. The support device is intended to counteract this phenomenon. The cantilevers 11 bend and thereby compensate for the outward deformation of the wings 3, 4. Since the spring hardness of the spring beams 11 is constant over the operating range of the locking force, a computational design using known means is possible. The parallelism of the Mould clamping plates 5, 7 can thereby be maintained in the selected operating range.

Figure 4:
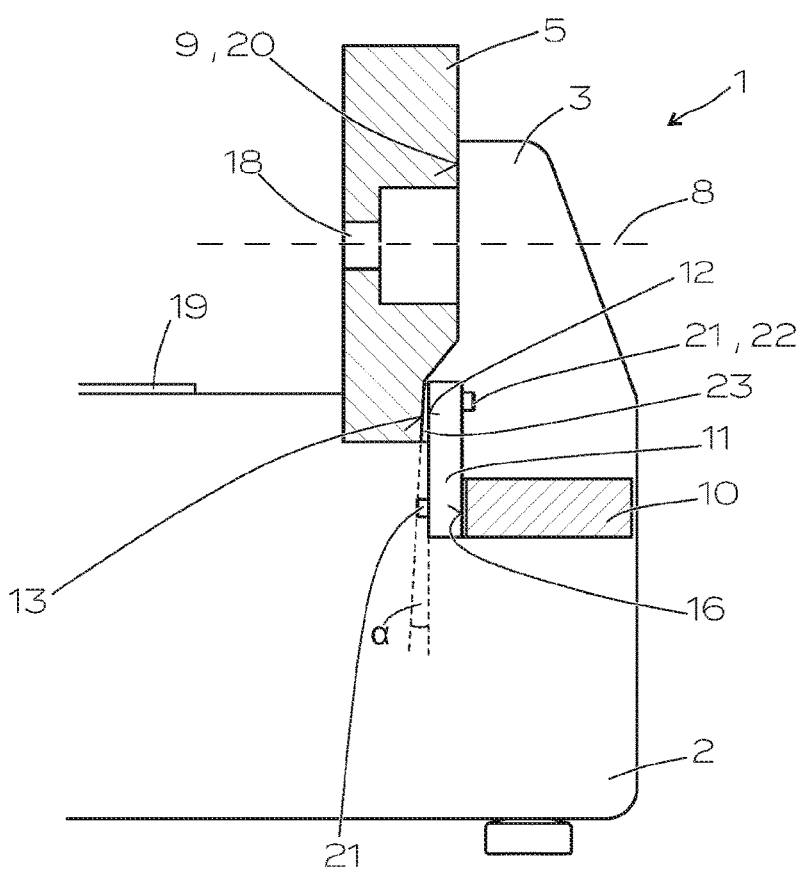
FIG. 4 shows a schematic sectional view of the closing unit of FIG. 1 in detail.

FIG. 4 shows a schematic sectional view of the closing unit of FIG. 1, similar to FIG. 2, wherein the area of the support unit and the stationary Mould clamping plate 5 is shown in detail in FIG. 4.

Also located in this region is the adjusting device, which in this example comprises an Angled contact surface 13 on the stationary Mould clamping plate 5 on the first support region 12, a wedge element 23 arranged between the Angled contact surface 13 and the Spring beam 11, and an Adjusting screw 22. The angle a of the Angled contact surface 13 compared to the direction of longitudinal extension of the cantilever 11 is approximately 4° in this example.

The inclination of the stationary Mould clamping plate 5 can be adjusted by the adjusting device before the application of the locking force. This allows a compensation of tolerances by production, assembly or the like, which could lead to a possible oblique position. In alternative embodiments not shown, the Angled contact surface 13 may additionally or alternatively be provided on the cantilever 11 and/or on the connecting cantilever 10, whereby a comparable effect can be achieved.

Figure 5:
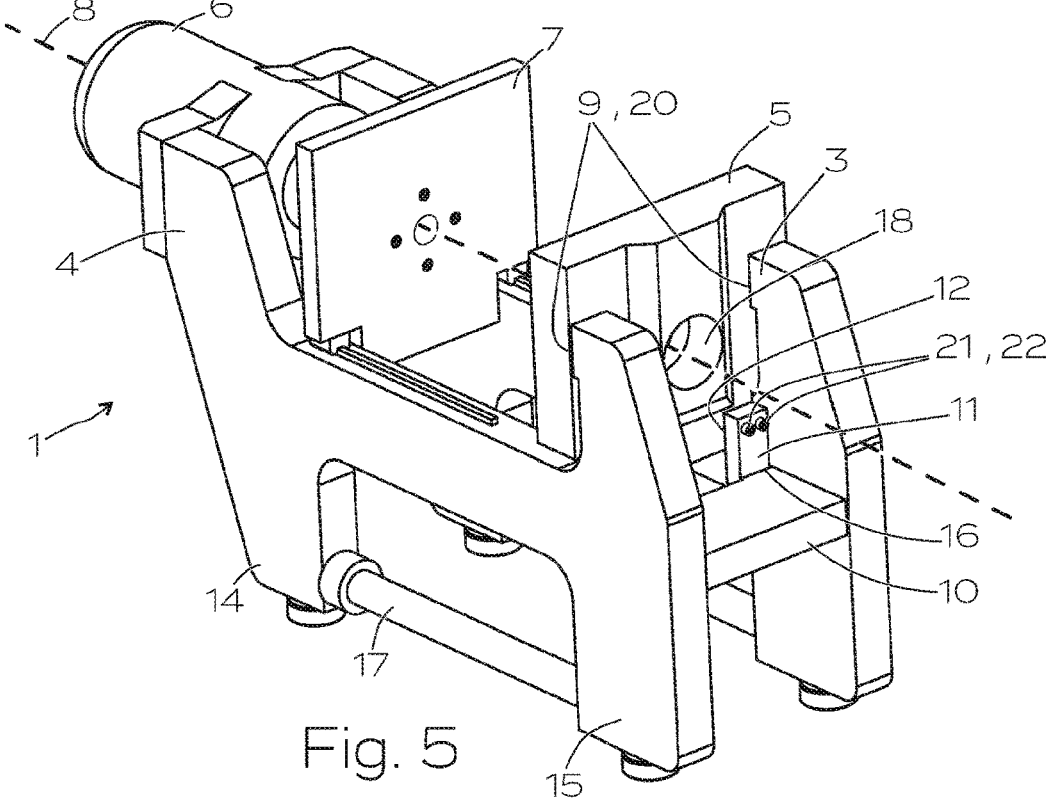
FIG. 5 shows a schematic perspective view of a closing unit according to a second exemplary embodiment according to the invention.

FIG. 5 shows a schematic perspective view of a closing unit according to a second exemplary embodiment according to the invention. In contrast to the first exemplary embodiment, the closing unit here is not designed with a C-shaped frame, but with an H-shaped frame. The Machine frame 1 therefore comprises, in addition to the First wing 3 and the Second wing 4, a Third wing 14 and a Third wing 15, the two last-mentioned wings 14, 15 pointing downwards in the operating position of the closing unit. A Compensation device 17 in the form of two compensation cylinders is arranged between the Third wing 14 and the Third wing 15. The Compensation device 17 serves to compensate for the deformation of the machine frame, so that the support device only has to compensate for the deformation of the first wing. The compensation device 17 is designed in a known manner as a hydraulic system.

Apart from the difference explained in the preceding paragraph, the closing unit according to the second exemplary embodiment has all the features and functions of the first exemplary embodiment. Therefore, these will not be discussed in more detail.

Figure 6:
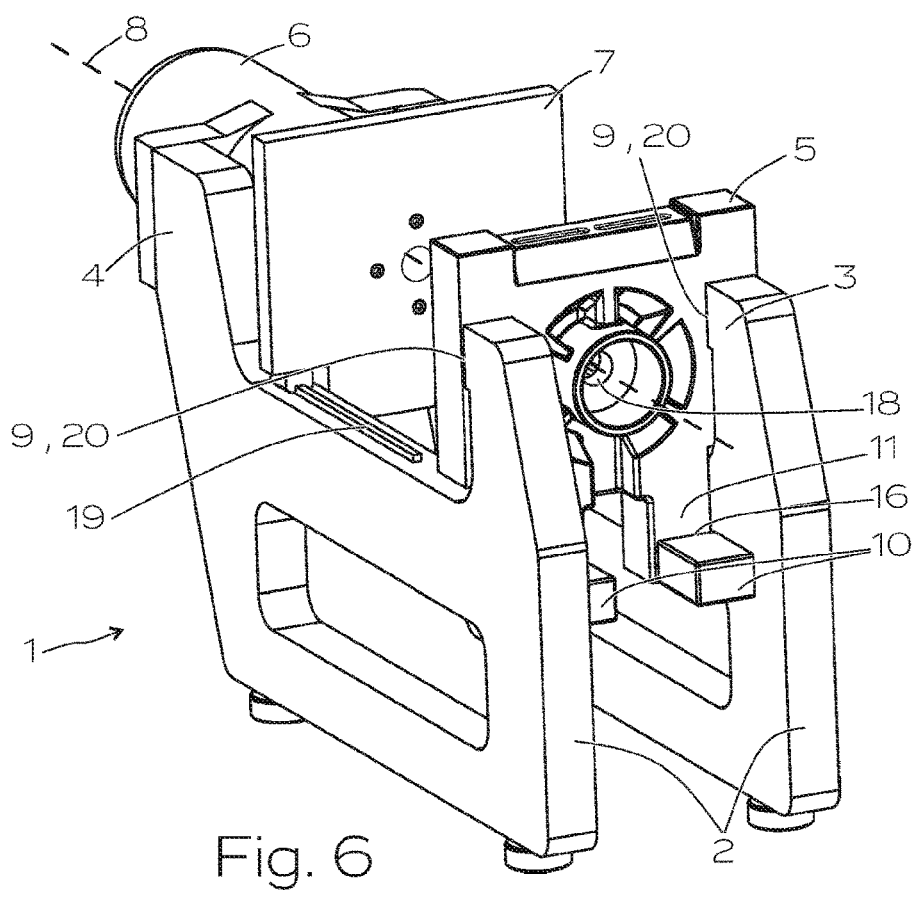
FIG. 6 shows a schematic perspective view of a closing unit according to a third exemplary embodiment according to the invention.

FIG. 6 shows a schematic perspective view of a closing unit according to a third exemplary embodiment according to the invention. In contrast to the first exemplary embodiment, the supporting device comprises two separate connecting beams The two connecting beams 10 are shaped as projections on the Frame parts 2 and serve to support the two spring beams 11. The spring beams 11 are formed integrally with the stationary Mould clamping plate 5 in the form of extensions. In this exemplary embodiment, too, the spring beams 11 are arranged next to one another. However, the connecting beams 10 are not connected to one another, and thus the frame parts are also not connected to one another at this point.

Figure 7:
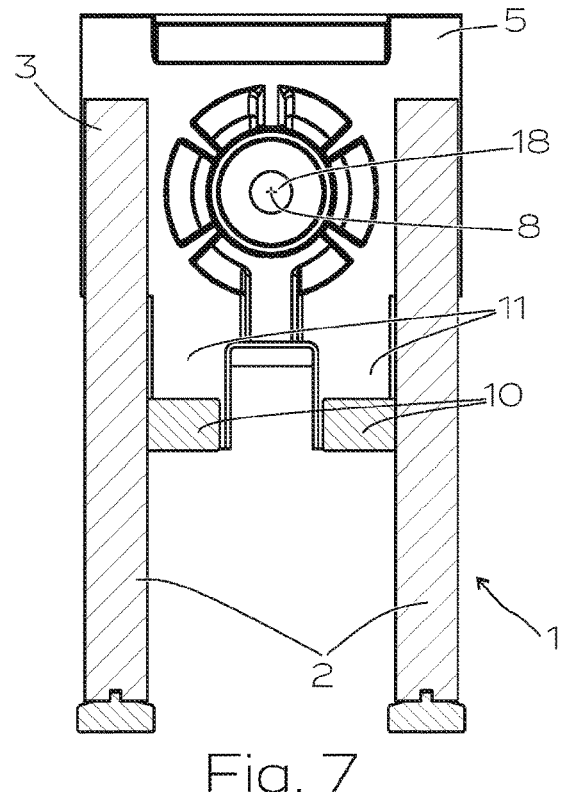
FIG. 7 is a schematic sectional view of the closing unit of FIG. 6.

FIG. 7 shows a schematic sectional view of the closing unit of FIG. 6 along the plane A-A, wherein the separate connecting beams 10 can be seen here in detail.

Apart from the differences explained, the closing unit according to the third exemplary embodiment has all the features and functions of the first exemplary embodiment. Therefore, these will not be discussed in more detail.

The invention claimed is:

1. Column-free closing unit for an injection-moulding apparatus, wherein the closing unit has a machine frame (1), comprising two frame parts (2), wherein the machine frame (1) comprises a first wing (3) and a second wing (4), wherein a fixed Mould clamping plate (5) is provided, which is arranged on the first wing (3), wherein the fixed Mould clamping plate (5) is fixedly connected to the first wing (3) at a fastening region (9), wherein a closing device (6) is provided which engages on the second wing (4) and which is connected to a movable mould clamping plates (7), wherein the closing device (6) is configured to move the movable mould clamping plates (7) along a machine longitudinal axis (8) and to exert a pressing force in the direction of the fixed mould clamping plates (5), wherein the fixed mould clamping plate (5) is elastically supported against the machine frame (1) below the fastening region (9) via a support device, wherein the support device comprises a Connecting beam (10) extending substantially in the direction of the longitudinal axis (8) of the machine, characterized in that the support device comprises at least one cantilever (11) which is subjected to bending stress when the pressing force is applied, the cantilever (11) being designed to transmit the pressing force from the fixed mould clamping plates (5) to the connecting beam (10), and in that the cantilever (11) runs substantially orthogonal to the machine longitudinal axis (8) and substantially orthogonal to the connecting beam (10).

2. The closing unit according to claim 1, characterized in that a connecting beam (10) connects the two frame parts (2) to one another, or in that two separate connecting beams (10) are provided, each of which is arranged on a frame part (2).

3. The closing unit according to claim 1, characterized in that the support device comprises a plurality of spring beams (11), the spring beams (11) being arranged next to one another in the direction of longitudinal extent of a connecting beam (10).

4. The closing unit according to claim 2 characterized in that a spring bar (11) is arranged on each connecting beam (10) when two separate connecting beam (10) are provided.

5. The device according to claim 1, in that the cantilever (11) is/are connected to the fixed mould clamping plates (5) at a support region (12), wherein the support region (12) is arranged in the lower half of the fixed mould clamping plates (5), and wherein the fastening region (9) is arranged in the upper half of the fixed mould clamping plates (5), or that the cantilever (11) is/are formed integrally with the fixed plates (5).

6. The closing unit according to claim 5, characterized in that the support region (12) is arranged above the corresponding connecting beam (10) with respect to the machine longitudinal axis (8).

7. The closing unit according to claim 1, characterized in that the cantilever (11) extend substantially parallel to one another when a plurality of cantilever (11) are provided.

8. The closing unit according to claim 1 characterized in that an adjusting device is provided, which is configured to adjust the inclination of the fixed mould clamping plate (5).

9. The closing unit according to claim 8, characterised in that the adjusting device comprises an angled contact surface (13), the angled contact surface (13) being arranged on one or more of the following components:

on the fixed mould clamping plate (5) in the connection region to the spring beam (11), wherein the angled contact surface (13) being arranged in particular on the support region (12), on the cantilever (11) in the connection area to the fixed plates (5), on the cantilever (11) in the connecting area to the connecting beam (10), on the connecting beam (10) in the connecting region to the spring beam (11), wherein the angled contact surface (13) has an angle of inclination a of greater than $0°$ with respect to the longitudinal extension direction of the spring beam (11), wherein optionally at least one angled contact surface (13) is provided per spring beam (11).

10. The closing unit according to claim 8 characterised in that the adjusting device comprises an adjusting screw (22), an adjusting screw (22) optionally being provided on each spring bar (11).

11. Closing unit according to claim 1, characterised in that the cantilever(s) (11) is/are screwed to the fixed mould clamping plate (5), and/or in that the cantilever (11) is/are screwed to the cantilever (11).

12. Closing unit according to claim 1, characterised in that the cantilever (11) is/are prestressed against the fixed mould clamping plate (5).

13. Closing unit according to claim 1, characterised in that the connecting beam (10) is inserted into recesses in the frame parts (2), or in that the connecting beam (10) is made in one piece with at least one frame part (2).

14. The closing unit according to claim 1, the machine frame (1) has a substantially C-shaped frame geometry, or that the machine frame (1) has a substantially H-shaped frame geometry, wherein the machine frame (1) additionally comprises a third wing (14) and a fourth wing (15), wherein a compensation device (17) is arranged between the third wing (14) and the fourth wing (15).

15. The closing unit according to claim 14, characterised in that the compensation device (17) is operatively connected to the closing device (6).

16. The closing unit according to claim 1, characterized in that the closing device (6) comprises an electric, hydraulic and/or mechanical locking mechanism.

17. Arrangement of an injection-moulding apparatus with a closing unit according to claim 1, wherein an injection nozzle of the injection-moulding apparatus is arranged on the fixed mould clamping plate (5).

\* \* \* \* \*